Figure 1:
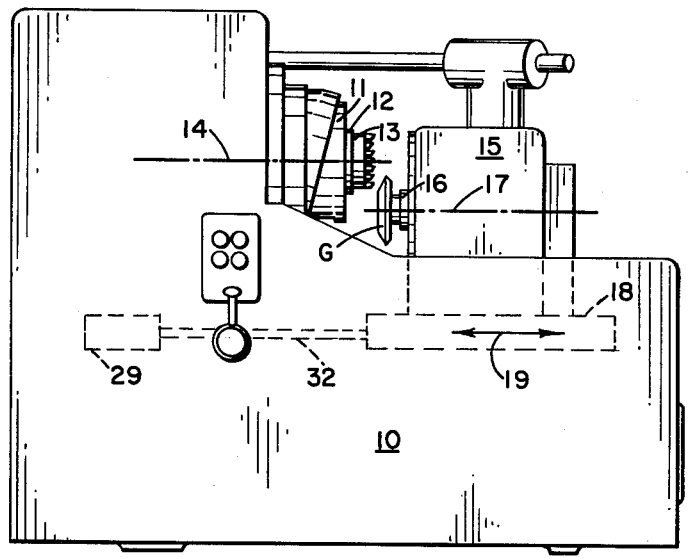

June 30, 1964 E. D. DAMMERT ETAL 3,138,996
FACE MILL CUTTER AND MACHINE FOR CUTTING GEARS
Filed Oct. 8, 1962 3 Sheets-Sheet 1

INVENTORS
EARL D. DAMMERT
JOSEPH V. FIDD
HARRY PEDERSEN
BY
Richard W. Treverton
ATTORNEY June 30, 1964  E. D. DAMMERT ETAL  3,138,996

FACE MILL CUTTER AND MACHINE FOR CUTTING GEARS

Filed Oct. 8, 1962  3 Sheets-Sheet 2

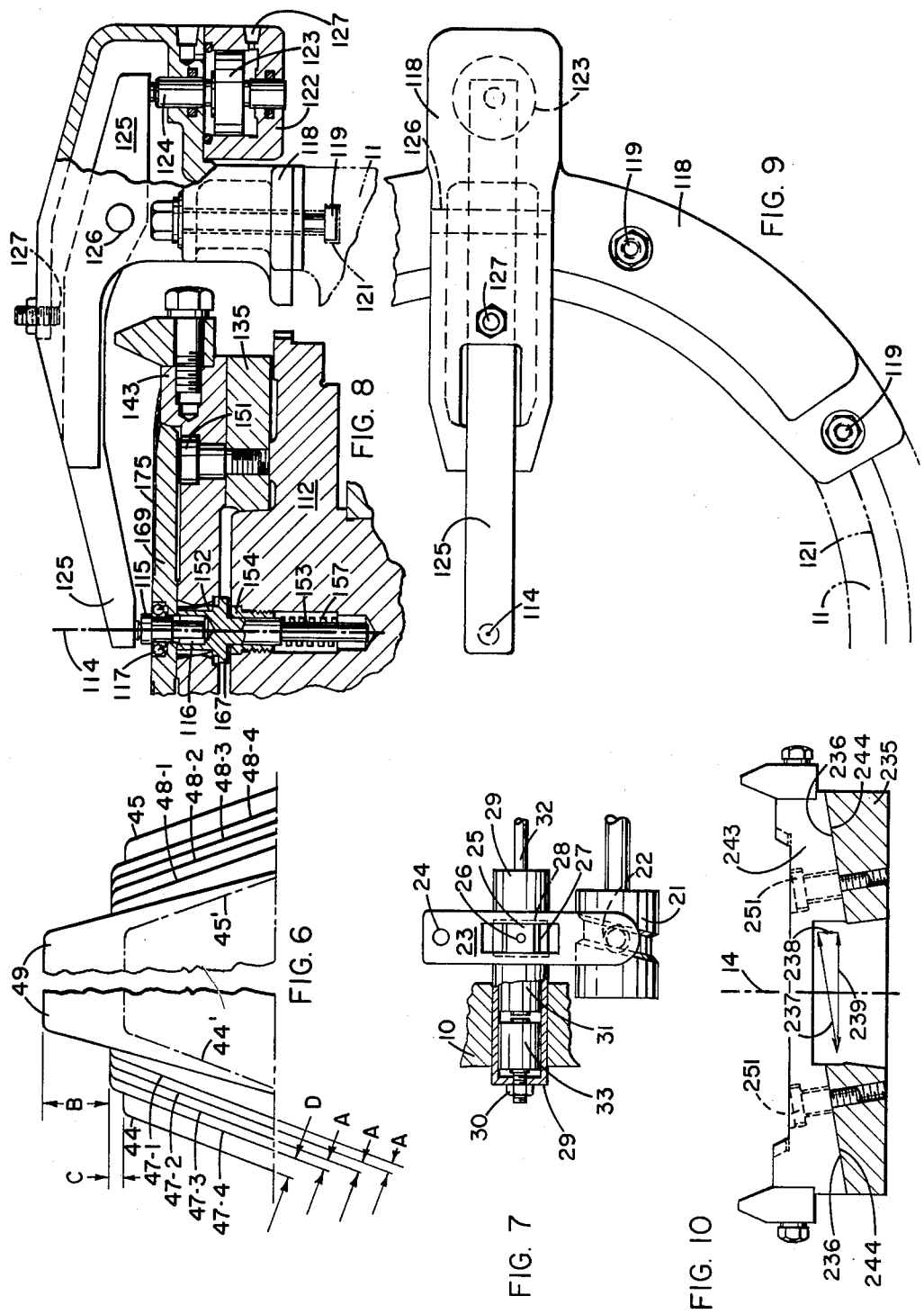

United States Patent Office 3,138,996
Patented June 30, 1964

3,138,996
FACE MILL CUTTER AND MACHINE FOR CUTTING GEARS
Earl D. Dammert, Webster, Joseph V. Fidd, Ontario, and Harry Pedersen, Rochester, N.Y., assignors to The Gleason Works, Rochester, N.Y., a corporation of New York
Filed Oct. 8, 1962, Ser. No. 229,024
14 Claims. (Cl. 90—5)

The present invention relates to an improvement in apparatus, for cutting gears and the like, of the general kind disclosed in Patent No. 2,913,962 granted November 24, 1959, to L. O. Carlsen and R. F. Pigage.

The cutter there disclosed has a series of roughing blades and two finishing blades arranged in a single circle of blades, with the finishing blades inset from the roughing blades and with a first gap between the last roughing blade and the first finishing blade and a second gap between the last finishing blade and the first roughing blade. In cutting each tooth slot the cutter makes several revolutions during which a roughing infeed is effected between the cutter and workpiece at such rate that only the roughing blades cut. Then, when the roughing infeed has been completed and the first gap is abreast of the work, an additional infeed is effected to relatively advance the finishing blades to cutting depth. After these finishing blades have cut, and while the second gap is abreast of the work, a relative withdrawal is effected between the cutter and workpiece, and the latter is indexed in preparation for cutting the next tooth slot.

The productivity of a cutter of this kind depends largely upon the number of roughing blades it contains, while its useful life depends upon the length of the blades, which determines the number of times the cutter can be resharpened. The number of roughing blades of given length that can be provided is severely limited by the aforementioned gaps between the roughing and finishing blades. Furthermore the cutter usually has a separate finishing blade for each side of the tooth slot, and a further gap of greater length than the slot is provided between these two blades in order that only one of them will be in the cut at one time. This further limits the space available for roughing blades.

The primary object of the present invention is to eliminate or at least substantially reduce these gaps, to thereby enable a larger part of the cutter circumference to be devoted to roughing blades, with corresponding increase in productivity or cutter life, or both. This object is accomplished by so arranging the cutter that the roughing blades, which are rigidly interconnected, and finishing blades, which are also rigidly interconnected, may be brought alternately to the cutting position by relative movement between them, in a plane substantially transverse of the cutter axis, rather than, as before, by relative movement between the cutter and the workpiece.

Figure 2:
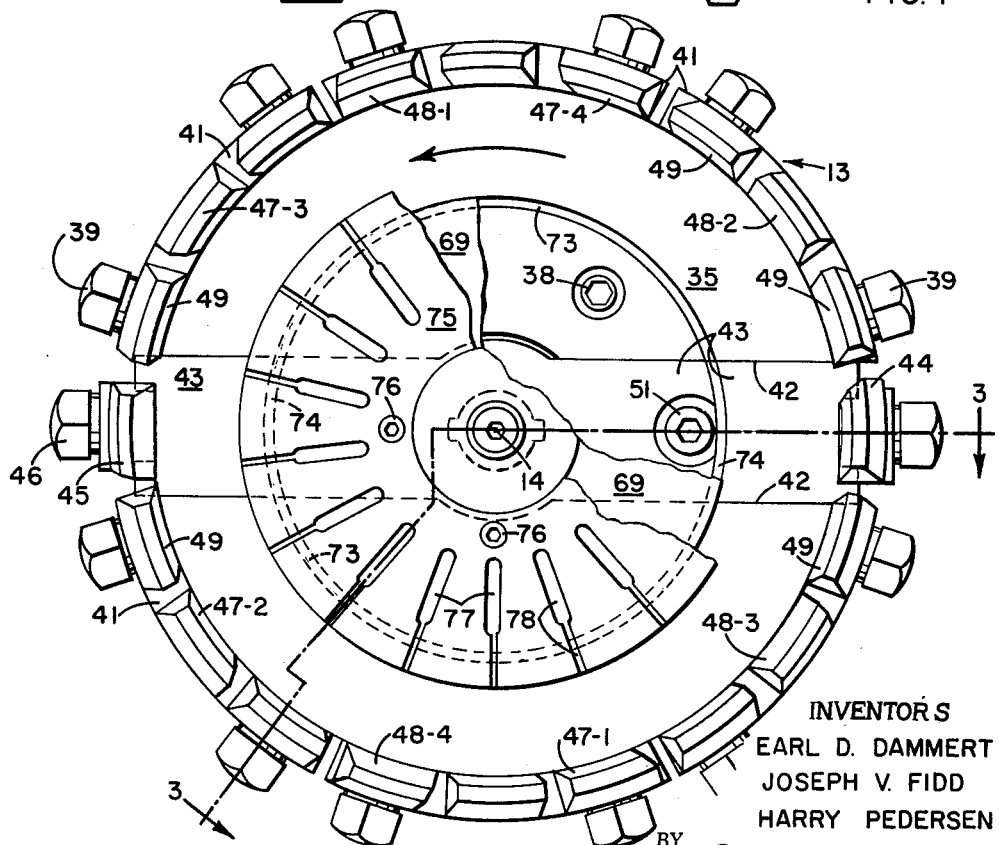
Figure 3:
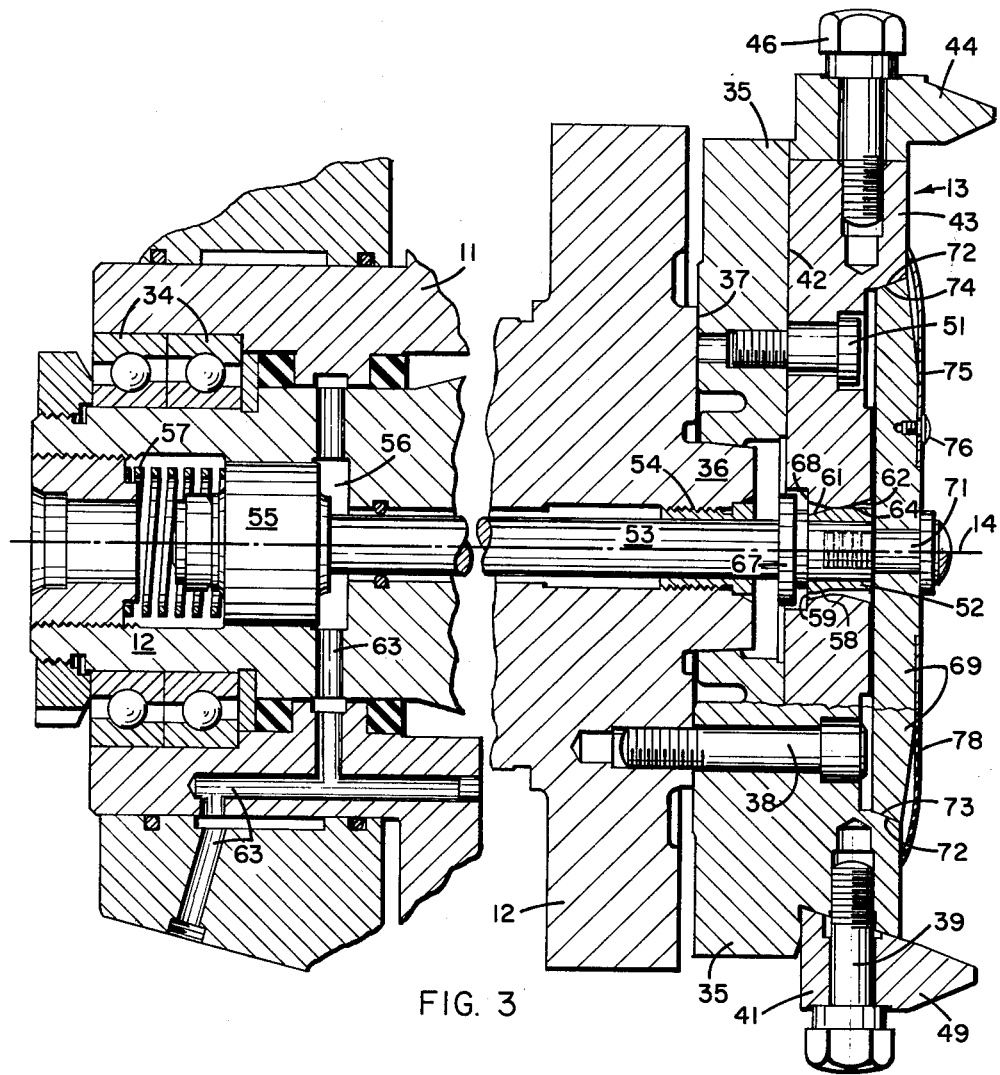
Figure 5:
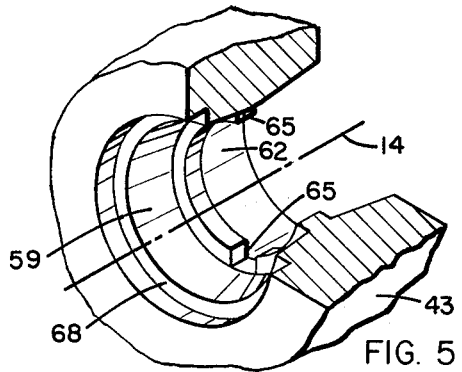
Figure 4:
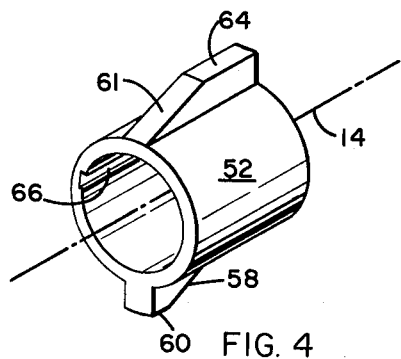

Preferred embodiments of the invention are shown in accompanying drawings, wherein:

FIG. 1 is a side view of the gear cutting machine;
FIG. 2 is a front view of the cutter;
FIG. 3 is a sectional view of the cutter and its supporting spindle approximately in the axial planes designated 3—3 in FIG. 2;
FIGS. 4 and 5 are isometric views respectively of a cam for moving the blade-supporting member and of the cam-receiving portion of the member;
FIG. 6 is a magnified diagrammatic view showing the relationship of the cutting edges of the several blades when all of them have been rotated about the cutter axis into the same plane;
FIG. 7 is a schematic plan view, partly in section, of the feed mechanism of the machine;
FIG. 8 is a view in a cutter axial plane, showing a modified cutter and a hydraulic actuator therefor;
FIG. 9 is a front view of the actuator; and,
FIG. 10 is a fragmentary axial sectional view of another modification of the cutter.

Referring to FIG. 1, the machine comprises a frame 10 having adjustable thereon a housing 11 in which a spindle 12 for face mill cutter 13 is journaled for rotation about axis 14. The frame also has adjustable thereon a housing 15 journaling a work spindle 16 for rotation about horizontal axis 17, the latter spindle supporting a work gear G, which in this illustration is a spiral bevel gear. Housing 15 is adjustable vertically, and also angularly about a vertical axis, upon a horizontal slide 18 which is movable along ways on the frame 10 in the direction of arrow 19. By adjustment of the housings 11 and 15 the machine may be adapted to cut a tooth slot of any desired spiral angle and depth in the gear G by relative infeed between the rotating cutter and the gear.

The feed motion is effected by movement of slide 18 by means of a conventional feed cam 21, FIG. 7, which is connected to a motor-driven gear train, not shown, to the cutter spindle 12. One tooth space is cut during each revolution of the cam, the cutter during the same time making a number of complete revolutions which depends upon the gear ratio of the train. The cam has thereabout a continuous cam track engaged by a follower roller 22 carried by a lever 23 that is fulcrumed at 24 to the frame 10. A block 25 adjustable along the lever 23 (by suitable means, not shown) is pivoted at 26 to a block 27, and the latter is slidable back and forth along a guideway 28 in a cylinder member 29 that is reciprocable axially in the frame, such adjustment of block 25 serving to vary the stroke of slide 18 effected by cam 21. A main piston 31 in the cylinder member is connected by a rod 32 to slide 18. An auxiliary piston 33 in the cylinder limits motion of piston 31 to the left. Piston 33 carries an adjustable stop 30 which limits its stroke in the cylinder.

At the start of operation, hydraulic fluid introduced into the right end of cylinder 29 moves the piston 31 to its extreme left limit position wherein it abuts piston 33, this action moving the slide 18 and gear G from a loading position to cutting position. The cam 21 is then rotated and acts through the lever 23, cylinder 29, piston 31 and rod 32 to move the slide 18 further to the left, effecting cutting infeed of the work gear in time with rotation of the cutter. At the end of the infeed a dwell in the cam holds the slide 18 in its full infeed position for a short time. Then the cam withdraws the slide, and, in preparation for the repetition of the cutting cycle, the gear G is indexed about axis 17 to bring a successive tooth space into cutting position. As is conventional, the indexing mechanism, not shown, is connected in the gear train to operate once per revolution of cam 21. After all of the tooth slots have been cut, the cam and cutter drive is stopped and hydraulic pressure is applied to the cylinder 29 between the two pistons 31, 33 to return the slide 18 to the right to loading position.

Referring to FIGS. 2 and 3, the cutter spindle 12 is journaled in housing 11 on axially spaced pairs of anti-friction bearings, the rear pair of which is designated 34. The cutter 13 comprises a drum-shaped body or head 35 seated on tapered center 36 and front face 37 of the spindle and secured thereon by a plurality of screws 38. Secured to the periphery of the head by screws 39 are segments 41 each of which has three roughing blades integral therewith. A groove 42 extending diametrically across the front face of head 35 guidingly receives a transverse slide 43 whose ends are notched to respectively receive an outside finishing blade 44 and an inside finishing blade 45. These blades, which are held in the notches by screws 46, are arranged in the same circle about the axis 14 as the roughing blades.

The roughing blades comprise outside cutting blades 47, of which in the illustrated cutter there are four, respectively designated 47–1 to 47–4, and a like number of inside cutting blades 48, designated 48–1 to 48–4. Between every pair of adjacent outside and inside cutting blades (including the finishing blades), there is a tooth bottom cutting blade 49.

The slide 43 is slidably held to the cutter head by headed studs 51 and is actuated by a cam 52. The latter is secured to a piston rod 53 which is supported by a bushing 54 for reciprocation along axis 14 in spindle 12, such reciprocation being effected hydraulically by a piston 55 which is arranged in cylinder chamber 56 in the spindle and is backed by a compression spring 57. Referring also to FIGS. 4 and 5, the cam has a tapered lobe 58 to engage tapered surface 59 of a bore through the slide. This lobe is adapted to cam the slide downwardly in FIG. 3, and to the left in FIG. 2, to retract finishing blades 44 and 45 from cutting position when spring 57 moves the cam forwardly (to the right in FIG. 3). Another tapered lobe 61 on the cam is adapted to engage tapered surface 62 of the bore, to move the slide in a direction (upwardly in FIG. 3 and to the right in FIG. 2) to advance the finishing blades toward cutting position when the piston 55 moves the cam rearwardly as the result of hydraulic pressure being applied to cylinder 56 through passages 63. Cam lobe 61 has a dwell portion 64 which engages the slide as the latter approaches finish cutting position. A shoulder in the bore of the slide between tapered surfaces 59 and 62 has keyways 65, FIG. 5, which receive the lobes 58 and 61 and thereby hold the cam against rotation, and a key on piston rod 53 seats in an internal keyway 66, FIG. 4, in the cam to hold the rod against rotation.

Forward motion of cam 52 is limited by abutment of a flange 67 on rod 53 with a shoulder 68 in the bore through the slide 43. In this position a dwell 60 on cam lobe 58 holds the slide in its limit position wherein blades 44, 45 are retracted. The advanced, cutting position of these blades is determined by a clamp plate 69 which is secured to the rod 53 by a screw 71. The plate has a conical surface 72 coaxial of axis 14 for seating on complementary internal conical surfaces 73 and 74 respectively of the cuter head and the slide. In the terminal portion of each stroke of piston 55 to the left, the seating of surface 72 on surfaces 73 and 74 centers and clamps the slide upon the cutter head with the finishing blades in cutting position, i.e. with the side cutting edge of the outside finishing blade 44 projecting radially outward beyond the roughing blade 47–4 and the side cutting edge of the inside finishing blade projecting radially inward beyond the roughing blade 48–4. A dished metallic spring guard 75 is secured to plate 69 by screws 76, its periphery bearing on the front face of the cutter head and slide 43 in both forward position and in the rearward position of the clamp plate, to exclude foreign matter from the internal parts of the cutter. To render the guard sufficiently flexible it has radial slots 77 which are closed by a rubber-like material 78. In addition to its protecting function the guard plate aids the spring 57 in releasing the clamp plate 69 and also aids in holding the clamp plate perpendicular to axis 14.

The relative positions of the several cutting edges are shown in FIG. 6. Since the outside and inside roughing blades, 47, 48, cut while there is a substantially constant relative infeed motion approximately along axis 14 between the cutter and the work effected by cam 21, and since one outside and one inside roughing blade is omitted from the circle of blades to provide spaces for finishing blades 44 and 45, the remaining side cutting roughing blades are stepped in order to equalize the chip load on them. For example, assuming a roughing infeed at a rate such that the side cutting edges would remove stock from the tooth sides of a thickness of 0.020 inch per revolution of the cutter, the side cutting edges of blades 47–2, 47–3 and 47–4 would be respectively outset from the preceding blades 47–1, 47–2 and 47–3 by a dimension A equal to 0.001 inch, so that each blade would remove 0.005 inch of stock, whereas without such stepping, the blades 47–2, 47–3 and 47–4 would each remove 0.004 inch of stock while the blade 47–1, following after the omitted roughing blade, would remove 0.008 inch. For the same reason the blades 48–1 to 48–4 are similarly stepped.

No such stepping of the bottom cutting blades 49 is necessary in the illustrated cutter, for the reason that none of these blades is omitted from the blade circle. As shown, these blades 49 preferably project axially beyond the side cutting roughing blades by a distance B on the order of 0.010 inch, while the finishing blades are preferably inset axially by a smaller distance C, on the order of 0.003 inch. When advanced to cutting position the side cutting edges of the finishing blades 44 and 45 are respectively outset and inset from the preceding roughing blades 47–4 and 48–4 by the desired thickness D of the finishing cut, in this instance about 0.002 inch, whereas when retracted to the non-cutting positions shown at 44′ and 45′ they are substantially inset and outset respectively from the side cutting blades 47–1 and 48–1.

The machine is provided with valve means (not shown) controlling the application of hydraulic pressure passages 63 and operating in time with the feed cam 21. The timing is such that after the roughing infeed has been completed and infeed dwell portion of cam 21 is effective, hydraulic pressure is applied to cylinder 56 for a time long enough to advance and clamp the finishing blade slide 43 and to allow both of the finishing blades to cut. After they have cut, the hydraulic pressure in cylinder 56 is immediately released and the feed cam 21 withdraws slide 18 preparatory to indexing of the work gear. If it is desired to positively preclude roughing blades from scraping on the work gear while the finishing blades are cutting, the same valve means which apply pressure to cylinder 56 (or other valve means which operate at the same time) may apply sufficient hydraulic pressure to the left end of cylinder 29 to move piston 33 to the right by one or a few thousandths of an inch, to the limit of its stroke determined by stop 30, simultaneously with advance of slide 43 to finish cutting position, to retract the bottom cutting edges of blades 49 slightly from the bottom of the tooth slot.

In a typical case, the cam 21 may be arranged to turn once while the cutter makes sixteen turns (one turn of the cutter for a 22½° advance of the cam), and have a constant-lead infeed section extending for 292½° around its periphery, an infeed dwell section of 22½° for finish cutting, and a withdrawal and withdrawn dwell section of 45° for indexing. The roughing infeed may start when blade 47–3 is approximately abreast of the work gear G, and end at the conclusion of thirteen full turns of the cutter. With the cam follower now at the beginning of the infeed dwell of the cam, the slide 43 is shifted to bring the finishing blades into cutting position; the outside roughing blade 47–4 takes its final cut, at full depth, and the outside finishing blade 44 takes its cut. Then, after inside roughing blade 48–4 takes its last cut, blade 45 makes the inside finishing cut. When blade 47–3 next is approximately abreast of the workpiece, at the end of the fourteenth turn of the cutter, the withdrawal for indexing commences and the slide 43 is shifted to retract the finishing blades. By the end of the sixteenth turn of the cutter the indexing has been completed and the cam follower is ready to re-enter the infeed section of the cam, to begin another tooth cutting cycle.

In the modification shown in FIGS. 8 and 9 the hydraulic actuator for the slide which carries the finishing blades is disposed externally of the cutter spindle. In this modification the cutter spindle is designated 112, the cutter rotation axis 114, the cutter head 135, the finishing-blade-carrying slide 143, the slide-retaining-studs 151, the slide-actuating cam 152, the cam-supporting rod 153 and its forward-stop flange 167, the rod-supporting sleeve 154, the rod-actuating compression spring 157, the clamp plate 169, and the guard plate 175. The forward end of rod 153 has a central bore in which the shank of a headed pin 115 is journaled in needle bearings 116. The forward portion of the pin shank is journaled in a radial and axial thrust ball bearing 117 supported by clamp plate 169.

The hydraulic actuator comprises a bracket 118 supported on cutter spindle housing 11 (shown also in FIG. 1), for angular adjustment thereon about axis 114. For this purpose the bracket is secured by bolts 119 anchored in a circular T-slot 121 in the front face of the spindle housing. By this adjustment the bracket may be brought to a position about the axis 114 in which it will not interfere with the work gear G. The bracket has secured thereto a hydraulic cylinder 122 containing a piston 123. The forward end of the piston rod, 124, abuts one end of a lever 125 which is fulcrumed on the bracket by pin 126. The opposite end of the lever abuts the head of pin 115.

In operation, during rough cutting no hydraulic pressure is applied to piston 123 and the spring 157 holds the rod 153 in its forward limit position wherein its flange 167 abuts a shoulder in the cam-receiving bore of slide 143 corresponding to shoulder 68 in FIG. 5, the cam 152 in this position holding the slide 143 in the position thereof in which the finishing blades are retracted, as at 44′ and 45′ in FIG. 6. A stop screw 127 threaded into the bracket 118, and secured by a lock nut, abuts the lever 125 to so limit the clockwise (in FIG. 8) motion of the lever that the periphery of the guard plate 175 is held pressed against the front faces of cutter head 135 and slide 143. At the conclusion of rough cutting, hydraulic pressure is applied to cylinder 122 through passage 127, causing the piston 123 to move lever 125 counterclockwise, to the position shown in FIG. 8, and thus move the rod 153 and cam 152 inwardly to shift slide 143 nearly to finish cutting position. In the terminal part of this motion the clamp plate 169 brings the slide to and clamps it in finish cutting position, wherein the blades it carries are in the relative positions shown in full lines at 44 and 45 in FIG. 6.

FIG. 10 shows the cutter head 235 and transverse finishing-blade-carrying slide 243 of another modification of the cutter. These parts are essentially like those designated respectively 35 and 43 in FIGS. 2 and 3 except that their sliding surfaces 236 and 244 are inclined to the plane of cutter rotation about axis 14, and that the studs, 251, which hold the slide to the cutter head, are similarly inclined. As the slide is moved back and forth by the cam means shown in FIGS. 4 and 5, or by equivalent means, to shift the slide-carried blades between non-cutting and cutting positions, its motion is therefore in the direction designated 237, which has an axial component 238 as well as radial component 239. By reason of this axial component the finishing blades may be so positioned that while their side edges are cutting, i.e. when the slide is moved to its limit position to the right in FIG. 10, their tip cutting edges may come as close as desired to the bottom of the tooth slot, or even take a light cut, and yet be retracted far enough as to be entirely clear of the tooth bottom during the preceding roughing operation when the slide is in its limit position to the left in FIG. 10.

Having now described preferred embodiments of our invention, and their mode of operation, what we claim is:

1. Apparatus for cutting gears and the like comprising a face mill cutter having a rotatable body supporting a plurality of circularly arranged roughing blades, a slide movable on said body transversely of the rotation axis of the body and supporting at each end thereof a finishing blade, said finishing blades being interposed in the circle of roughing blades in diametrical opposition to each other, said finishing blades in one limit position of the slide being positioned to cut by being radially outset and inset respectively from the roughing blades and in the other limit position of the slide being radially inset and outset respectively from the roughing blades to non-cutting position, a cam reciprocable axially in said body to cam the slide back and forth substantially between said limit positions and having a dwell to hold the slide substantially in said one limit position, and a tapered clamp member movable in unison with the cam and adapted to clamp the slide to said body in said one limit position, the tapered surface of said clamp being a surface of revolution about said axis and the slide and body both having surfaces complementary to said tapered surface.

2. Apparatus according to claim 1 in which there is a resilient guard plate secured to said clamp member and having its periphery in contact with the front faces of the body and the slide in all operating positions of the clamp member.

3. Apparatus for cutting gears and the like comprising a face mill cutter having a rotatable body rigidly supporting a plurality of cutting blades, a member movable on the body in a plane substantially transverse of the cutter axis and rigidly supporting an outside cutting blade and an inside cutting blade in approximately the same circle about the axis of rotation of the body as said plurality of cutting blades and with the blades of the latter interposed in said circle between said inside and said outside blades, and means operable during rotation of the cutter for moving said member back and forth on the body to advance and retract the member-supported blades, in unison, with respect to the body-supported blades.

4. Apparatus according to claim 3 in which there are means operable during rotation of the cutter for clamping said member to said body in the position wherein the member-supported blades are in cutting position.

5. Apparatus according to claim 3 in which said member is a slide movable substantially rectilinearly in a direction transverse of said axis to move the cutting blade supported thereby substantially diametrically of said circle.

6. Apparatus according to claim 5 in which the means for moving the slide back and forth on the body comprises a cam reciprocable axially in said body.

7. Apparatus according to claim 6 having, to actuate said cam, fluid pressure actuated means comprising a cylinder-piston device supported by a support of said apparatus upon which the cutter is rotatable, and a pin supported by the cutter for relative rotation about said axis and arranged to transmit motion between said device and the cam.

8. Apparatus according to claim 5 in which the slide is movable on the cutter head at an acute angle to the plane of rotation of the cutter, whereby upon back and fourth movement of the slide the cutting blades carried thereby are advanced and retracted axially as well as radially.

9. Apparatus according to claim 7 in which said fluid pressure actuated means further comprises a lever fulcrumed on the machine and engageable with said pin and with said device.

10. Apparatus according to claim 6 having, to actuate said cam, fluid pressure actuated means comprising a cylinder-piston device coaxial of and rotatable in unison with the cutter.

11. Apparatus according to claim 3 having a cutter support and a workpiece support, means for effecting relative infeed between said supports in time with cutter rotation while the blades on said rotatable body are cutting and for effecting a relative withdrawal, to render the last-mentioned blades noncutting, concomitantly with movement of said member to bring said other blades into cutting position.

12. Apparatus according to claim 11 in which said cam has a dwell which becomes effective as the slide-supported blades approach cutting position, and there is a clamp member movable with the cam to clamp the slide to said body with the blades in said cutting position.

13. Apparatus according to claim 12 in which said clamp member has a conical surface coaxial of said axis and the slide and said body have complementary conical surfaces engaged by said member when in clamping position.

14. Apparatus according to claim 3 in which said other blades comprise one inside cutting blade and one outside cutting blade arranged in substantially opposed relation to each other in said circle.

References Cited in the file of this patent

UNITED STATES PATENTS

| | | |
|---|---|---|
| 1,398,477 | Tibbetts | Nov. 29, 1921 |
| 2,126,262 | Johanson | Aug. 9, 1938 |